US012703318B2

(12) United States Patent
Tomita

(10) Patent No.: US 12,703,318 B2
(45) Date of Patent: Aug. 11, 2026

(54) GAS GENERATOR

(71) Applicant: NIPPON KAYAKU KABUSHIKI KAISHA, Tokyo (JP)

(72) Inventor: Ozora Tomita, Himejishi (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/106,104

(22) PCT Filed: Aug. 7, 2023

(86) PCT No.: PCT/JP2023/028835

§ 371 (c)(1),
(2) Date: Feb. 24, 2025

(87) PCT Pub. No.: WO2024/043064

PCT Pub. Date: Feb. 29, 2024

(65) Prior Publication Data

US 2026/0014957 A1 Jan. 15, 2026

(30) Foreign Application Priority Data

Aug. 26, 2022 (JP) ................................ 2022-135382

(51) Int. Cl.
*B60R 21/264* (2006.01)
*B60R 21/26* (2011.01)

(52) U.S. Cl.
CPC ... *B60R 21/264* (2013.01); *B60R 2021/26011* (2013.01); *B60R 2021/26076* (2013.01)

(58) Field of Classification Search
CPC ......... B60R 21/264; B60R 2021/26011; B60R 2021/26076; B60R 2021/26017
See application file for complete search history.

(56) References Cited

U.S. PATENT DOCUMENTS 5,622,381 A 4/1997 Mossi et al.
9,902,364 B2 * 2/2018 Imai .................... B60R 21/2646
(Continued)

FOREIGN PATENT DOCUMENTS

JP 8-282427 A 10/1996
JP 10-152012 A 6/1998
(Continued)

OTHER PUBLICATIONS

Japanese Office Action issued Aug. 4, 2025 in Japanese Patent Application No. 2022-135382, 5 pgs.
(Continued)

*Primary Examiner* — Benjamin P Lee
(74) *Attorney, Agent, or Firm* — Oblon, McClelland, Maier & Neustadt, L.L.P.

(57) ABSTRACT

There is obtained a gas generator that can suppress deterioration due to moisture absorption of a gas generating agent in a housing, can reduce the number of parts, and can be easily assembled as compared with the related art. A gas generator includes a housing, a holder attached to one opening end of the housing, a closing member attached to another end of the housing so as to close another opening end of the housing, and a side surface cover covering a part of the holder and a part of an igniter. The side surface cover has an end welded and fixed to the housing and the holder at a welded fixed portion in a state of being sandwiched between an inner wall of the housing and a side surface portion. The welded fixed portion is formed in an annular shape along the circumferential direction of the housing by being subjected to welding processing from the outside of the housing along a circumferential direction of the housing at a position corresponding to the side surface portion covered by the side surface cover.

6 Claims, 6 Drawing Sheets

(56) References Cited

U.S. PATENT DOCUMENTS

| | | | | |
|---|---|---|---|---|
| 10,046,728 | B2 * | 8/2018 | Bierwirth | B60R 21/2646 |
| 10,953,842 | B2 * | 3/2021 | Imai | B60R 21/2646 |
| 12,060,031 | B2 * | 8/2024 | Inoue | B01J 7/00 |
| 2005/0011393 | A1 * | 1/2005 | Kelly | B60R 21/2644 102/430 |
| 2005/0230950 | A1 | 10/2005 | Fischer et al. | |
| 2015/0171541 | A1 | 6/2015 | Isenmann et al. | |
| 2017/0028964 | A1 * | 2/2017 | Bierwirth | B60R 21/26 |
| 2019/0047508 | A1 * | 2/2019 | Esau | F42B 3/04 |
| 2019/0077360 | A1 * | 3/2019 | Imai | B60R 21/2644 |
| 2019/0351863 | A1 * | 11/2019 | Ramp | B60R 21/2646 |
| 2020/0023805 | A1 * | 1/2020 | Hiraoka | F42B 3/24 |
| 2024/0217474 | A1 * | 7/2024 | Sasaki | B60R 21/2644 |
| 2024/0351549 | A1 * | 10/2024 | Takahashi | B60R 21/264 |
| 2025/0153676 | A1 * | 5/2025 | Shimazu | B60R 21/2644 |

FOREIGN PATENT DOCUMENTS

| | | | |
|---|---|---|---|
| JP | 11-321541 | A | 11/1999 |
| JP | 2003-226222 | A | 8/2003 |
| JP | 2007-512184 | A | 5/2007 |
| JP | 2009-126292 | A | 6/2009 |
| JP | 2012-76489 | A | 4/2012 |

OTHER PUBLICATIONS

International Search Report issued on Oct. 17, 2023, in PCT/JP2023/028835 filed on Aug. 7, 2023, therein 3 pages.

* cited by examiner

GAS GENERATOR

TECHNICAL FIELD

The present invention relates to a gas generator incorporated in an airbag device as an occupant protection device mounted on an automobile or the like, and particularly to a so-called cylinder-type gas generator having an elongated cylindrical outer shape.

BACKGROUND ART

An elongated cylindrical housing in a cylinder-type gas generator is generally configured such that at least one end is closed by a holder having an ignition portion (see, for example, Patent Literature 1 below).

CITATIONS LIST

Patent Literature

Patent Literature 1: U.S. Pat. No. 6,149,193 A
Patent Literature 2: U.S. Pat. No. 9,455,519 B2

SUMMARY OF INVENTION

Technical Problems

In Patent Literature 1 described above, since there are a large number of paths through which air passes between an internal space filled with a gas generating agent in the housing and the outside of the housing, there is a concern about deterioration due to moisture absorption of the gas generating agent in the housing. In Patent Literature 2, an O-ring, a sealing material, or the like is used to suppress moisture absorption of the gas generating agent in the housing. However, it is often necessary to provide a member such as an O-ring or a sealing material for each path through which the air passes, and the number of parts tends to increase. Such an increase in the number of parts disadvantageously complicates an assembly process of the gas generator.

Therefore, an object of the present invention is to provide a gas generator that can suppress deterioration due to moisture absorption of a gas generating agent in a housing, can reduce the number of parts, and can be easily assembled as compared with the related art.

Solutions to Problems (1) A gas generator of the present invention includes a housing having an elongated cylindrical shape and including, inside of the housing, an activation gas generation chamber in which an activation gas is generated by combustion of a gas generating agent and a filter chamber in which a filter through which the activation gas generated in the activation gas generation chamber passes is accommodated, a gas generating agent ignition unit that encloses an ignition charge, is disposed at one end in an axial direction of the housing, and allows the gas generating agent to be ignited and combusted in the activation gas generation chamber, and a holder fixed to one end in the axial direction of the housing and including a first forming portion having a substantially tubular shape and having a keeper that keeps the gas generating agent ignition unit on an inner side of the housing, and a second forming portion having a substantially tubular shape, integrally provided with the first forming portion on a side of the first forming portion opposite to the activation gas generation chamber, and having a fitting portion configured to be fitted with a connector for energizing the gas generating agent ignition unit on an opposite side of a keeping position of the gas generating agent ignition unit, and a side surface cover that is a bottomed tubular member having a tubular portion, covers at least a portion of the gas generating agent ignition unit closer to the activation gas generation chamber and at least a part of a side surface of the first forming portion, and is provided such that the tubular portion is sandwiched between an inner wall of the housing and the side surface of the first forming portion, in which at least a portion of the housing at a position corresponding to the side surface of the first forming portion covered with the side surface cover, a portion of the side surface cover corresponding to the portion, and a portion of a side surface of the holder corresponding to the portion are subjected to welding fixation annularly along a circumferential direction of the housing.

(2) In the gas generator according to (1), the welding fixation is preferably performed along a position of an end of the side surface cover closer to the holder.

(3) In the gas generator according to (1) or (2), an end of the side surface cover closer to the activation gas generation chamber is preferably provided with a bottom surface, and a tapered portion that is connected to the bottom surface and reduces in diameter toward another end in the axial direction of the housing.

Each of the above configurations can provide the gas generator that can better suppress moisture absorption of the gas generating agent in the housing and is easier to assemble than the related art.

DESCRIPTION OF EMBODIMENT

Hereinafter, an internal structure of a cylinder-type gas generator according to an embodiment of the present invention will be described with reference to FIGS. 1 to 3.

Configuration of Gas Generator 100

Figure 1:
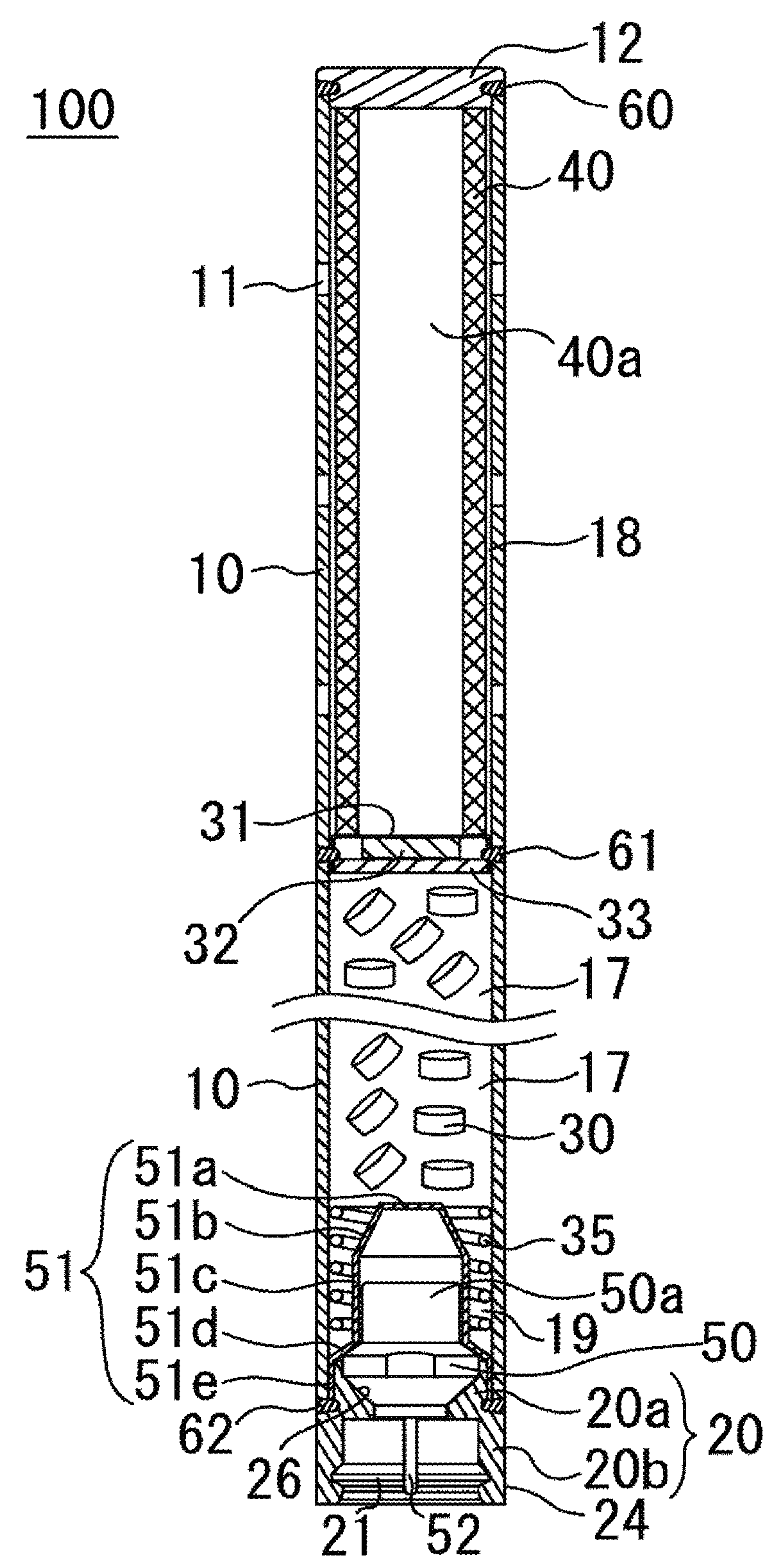
FIG. 1 is a schematic diagram showing an internal structure of a gas generator according to an embodiment of the present invention partially shown in cross section.

As shown in FIG. 1, a gas generator 100 has an elongated substantially columnar outer shape, and includes a housing 10, a holder 20 attached to one opening end of the housing 10, a closing member 12 attached to another end of the housing 10 so as to close another opening end of the housing 10, and a side surface cover 51 covering a part of the holder 20 and a part of an igniter 50.

The housing 10 includes an elongated cylindrical member having openings at both ends in an axial direction. The closing member 12 includes a disk-shaped member having a predetermined thickness, and has a welded fixed portion 60 on a peripheral surface of the member. The welded fixed portion 60 has an annular shape on the peripheral surface of the closing member 12 along a circumferential direction by being annularly welded and fixed to an outer periphery of one end of the housing 10. A gas ejection port 11 is provided in a peripheral wall near an end of the housing 10 where the closing member 12 is attached. The gas ejection port 11 is a hole for ejecting a gas generated inside the gas generator 100 to the outside, and a plurality of gas ejection ports 11 is provided along a circumferential direction and the axial direction of the housing 10.

The closing member 12 includes metal such as stainless steel, steel, aluminum alloy, or stainless alloy, and includes a substantially disk-shaped member having a predetermined thickness.

Figure 2:
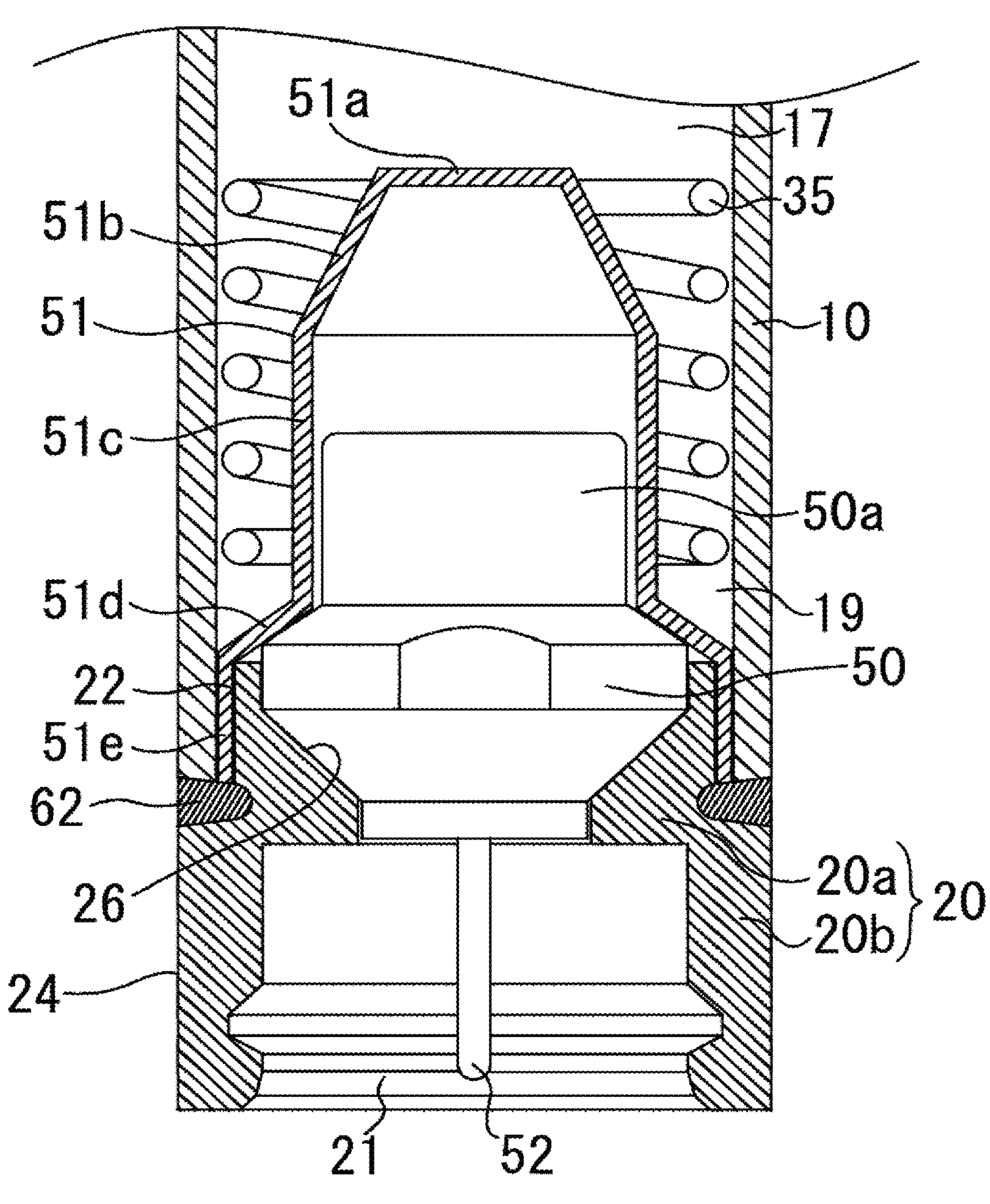
FIG. 2 is a partially enlarged sectional view of FIG. 1.

As shown in FIGS. 1 and 2, the holder 20 includes a first forming portion 20*a* having a keeper 26 that keeps the igniter 50 on an inner side of the housing 10, and a second forming portion 20*b* having, on an opposite side of a keeping position of the igniter 50, a fitting portion 21 that can be fitted with a connector (not shown) for energizing the igniter 50, the holder 20 being fixed to one end of the housing 10 closer to an ignition chamber 19. The holder 20 is a substantially tubular member including a metal such as stainless steel, steel, aluminum alloy, or stainless alloy.

Figure 3:
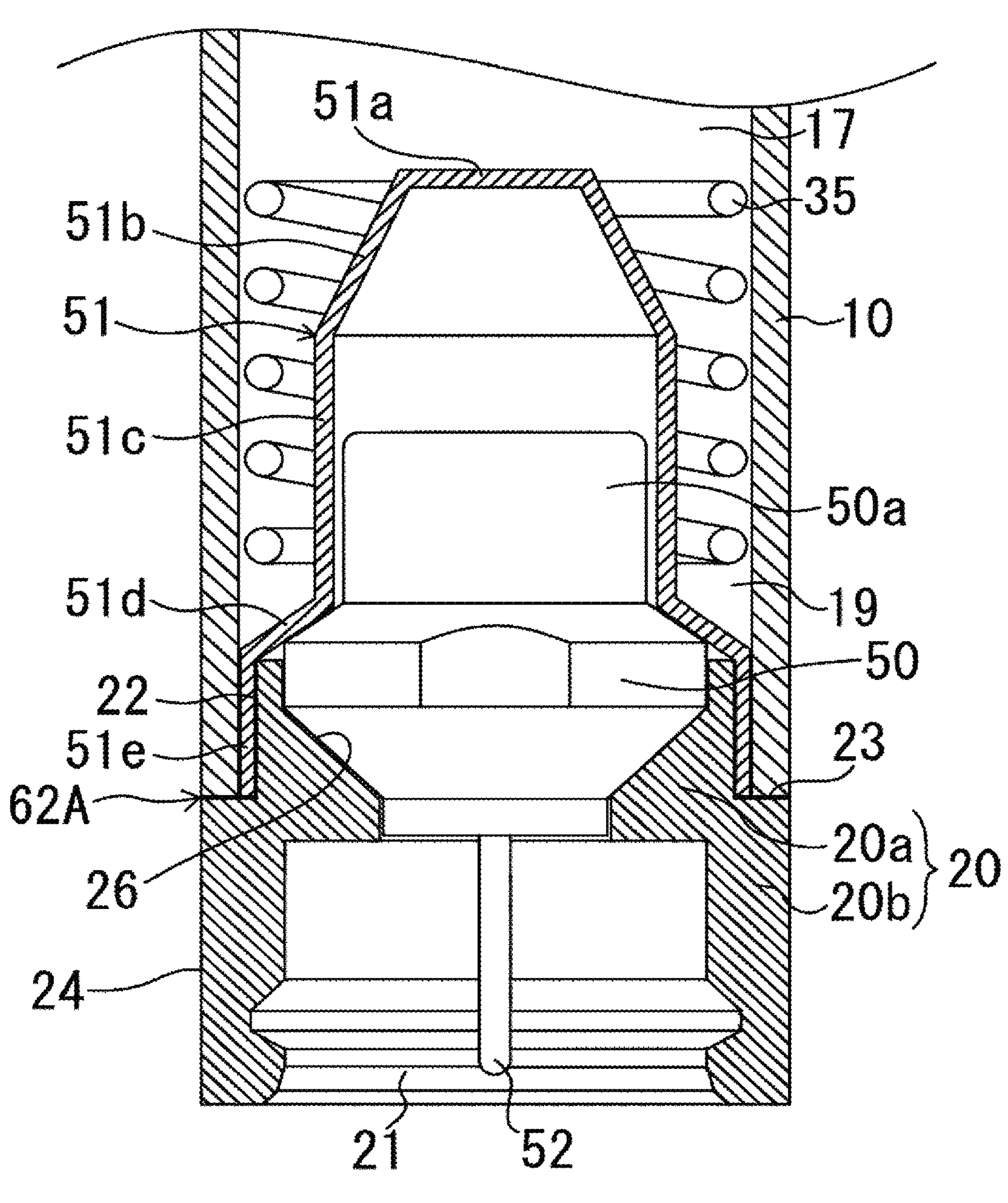
FIG. 3 is a diagram illustrating a state before welding fixation in FIG. 2.

As shown in FIG. 3, before execution of the welding fixing, the first forming portion 20*a* includes a side surface portion 22 for sandwiching an end of the side surface cover 51 closer to the igniter 50 together with an inner wall of the housing 10, and a positioning portion 23 used for positioning an end of the housing 10 closer to the igniter 50 before execution of the welding fixing and positioning the end of the side surface cover 51 closer to the igniter 50. The side surface portion 22 is formed to have an outer diameter smaller than an outer diameter of the second forming portion 20*b*. The positioning portion 23 is also a portion that forms a stair shape together with the side surface portion 22 and the side surface portion 24 of the second forming portion 20*b* before execution of the welding fixing. The second forming portion 20*b* is provided integrally with the first forming portion 20*a* on a side of the first forming portion 20*a* opposite to an activation gas generation chamber 17.

As shown in FIGS. 1 to 3, the side surface cover 51 includes a bottom 51*a*, a tapered portion 51*b* having one end connected and fixed to the bottom 51*a*, a first tubular portion 51*c* having one end connected and fixed to another end of the tapered portion 51*b*, an igniter abutment portion 51*d* having one end connected and fixed to another end of the first tubular portion 51*c*, and a second tubular portion 51*e* having one end connected and fixed to another end of the igniter abutment portion 51*d*. The side surface cover 51 is a directional member in which the bottom 51*a* is broken at the time of activation, a flame emitted from a distal end of the igniter 50 is aggregated by the tapered portion 51*b*, and the direction of the flame can be directed toward the activation gas generation chamber 17. A weak member (a recess provided on an external surface or the like) may be formed in the bottom 51*a* so that the bottom 51*a* is easily broken at the time of activation.

Figure 4:
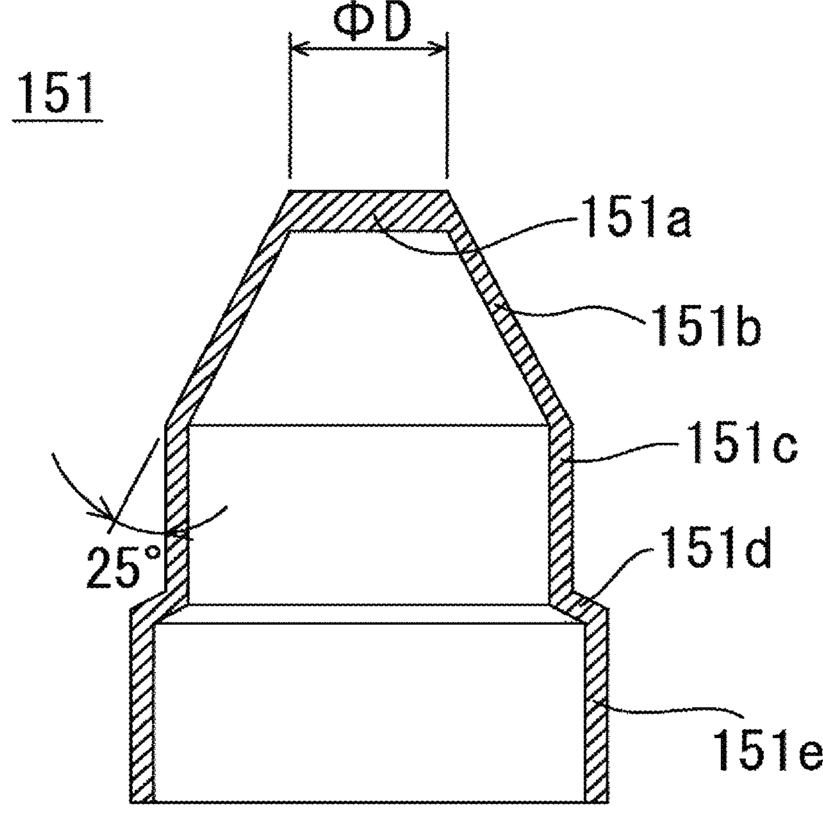
FIG. 4 is a sectional view illustrating an example of a side surface cover in FIG. 1.
Figure 5:
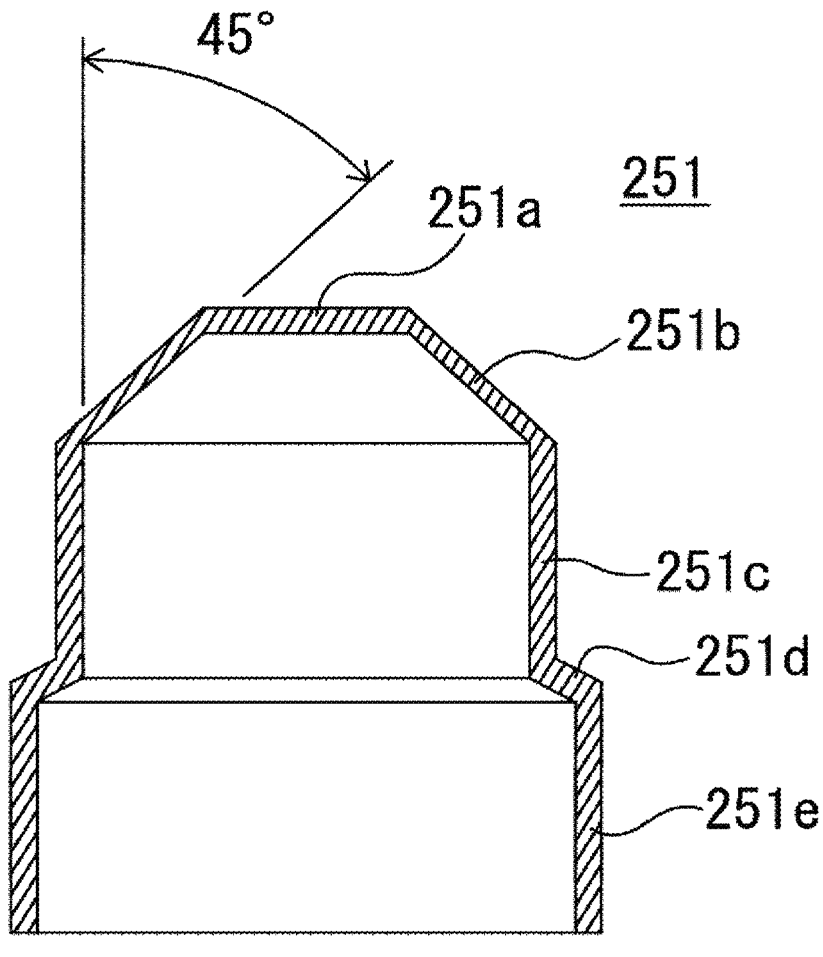
FIG. 5 is a sectional view illustrating an example of the side surface cover in FIG. 1.
Figure 6:
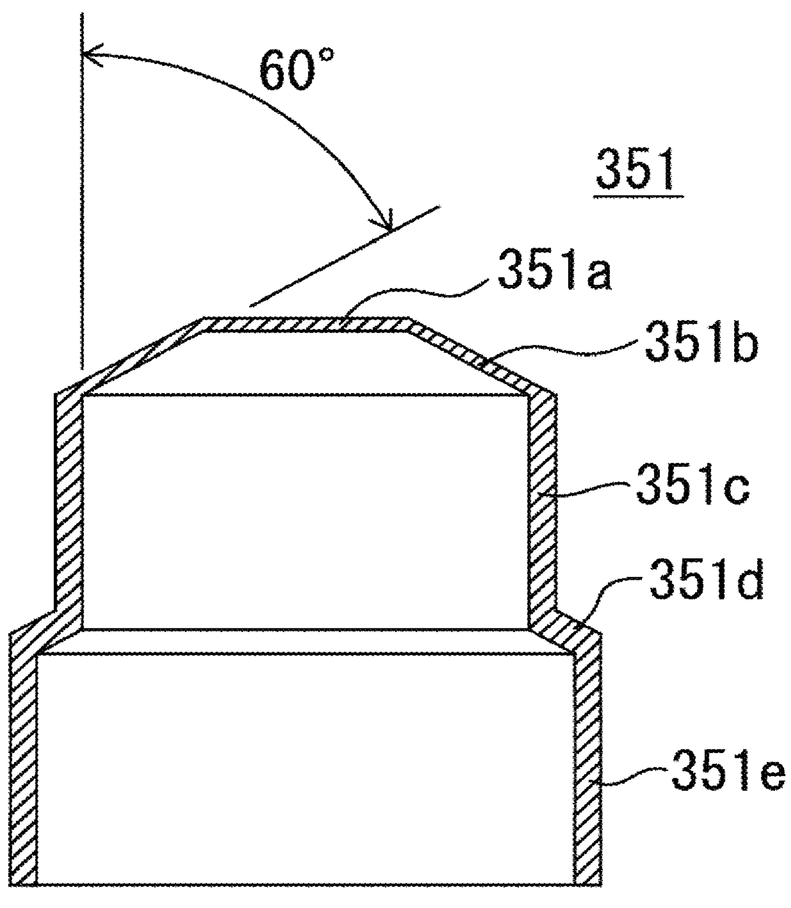
FIG. 6 is a sectional view illustrating an example of the side surface cover in FIG. 1.

A size of a diameter of the bottom 51*a* and an angle of the tapered portion 51*b* with respect to an axial direction of the first tubular portion 51*c* can be appropriately changed in consideration of an output or size of the igniter 50, a material (stainless steel, steel, aluminum alloy, stainless alloy, or the like) used for the side surface cover 51, and the like so that the bottom 51*a* breaks at the time of activation. For example, examples of the size of the diameter of the bottom 51*a* and the angle of the tapered portion 51*b* with respect to the axial direction of the first tubular portion 51*c* are shown in FIGS. 4 to 6. Hereinafter, FIGS. 4 to 6 will be described. Since reference signs having the same numbers in the last two digits are similar, the description thereof may be omitted. Parts that are not described are similar to those in the embodiment, and thus description thereof may be omitted.

In FIG. 4, an angle of a tapered portion 151*b* with respect to an axial direction of a first tubular portion 151*c* is 25°, and a diameter (ΦD) of a bottom 151*a* can be determined by various factors such as an angle of a tapered portion 151*b* with respect to the axial direction of the first tubular portion 151*c*, a diameter of the first tubular portion 151*c*, a distance from the first tubular portion 151*c* to the bottom 151*a*, the output or size of the igniter, and a material used for a side surface cover 151. For example, the diameter (ΦD) of the bottom 151*a* may be formed to have any size of 4 mm to 5 mm.

In FIG. 5, an angle of a tapered portion 251*b* with respect to an axial direction of a first tubular portion 251*c* is 45°, and in FIG. 6, an angle of a tapered portion 351*b* with respect to an axial direction of a first tubular portion 351*c* is 60°. Diameters of bottoms 251*a* and 351*a* of side surface covers 251 and 351 shown in FIGS. 5 and 6 can be determined by various factors such as the angle of the tapered portion with respect to the axial direction of the first tubular portion, the diameter of the first tubular portion, the distance from the first tubular portion to the bottom, the output or size of the igniter, and the material used for the side surface cover, as in the case of the side surface cover 151 shown in FIG. 4.

Apart from FIGS. 4 to 6, the diameter of the bottom 51*a* may be constant, and the angle of the tapered portion 51*b* with respect to the axial direction of the first tubular portion 51*c* may be appropriately changed by various factors such as the size of the output of the igniter 50 and the material used for the side surface cover 51.

The tapered portion 51*b* is a portion formed so as to reduce in diameter from the activation gas generation chamber 17 toward a filter chamber 18 (another end side in the axial direction of the housing 10).

The first tubular portion 51*c* is a directional portion capable of directing the direction of a flame toward the activation gas generation chamber 17, and is a tubular portion having an inner diameter equal to or substantially equal to an outer diameter of a squib cup 50*a* of the igniter 50.

As shown in FIGS. 1 and 2, the igniter abutment portion 51*d* is a portion that abuts on the igniter 50 and sandwiches and fixes the igniter 50 together with the holder 20.

As shown in FIGS. 1 and 2, the second tubular portion 51*e* is a tubular portion, and has an end welded and fixed to the housing 10 and the holder 20 at the welded fixed portion 62 in a state of being sandwiched between the inner wall of the housing 10 and the side surface portion 22. The welded fixed portion 62 is formed in an annular shape along the circumferential direction of the housing 10 as shown in FIG. 2 by being subjected to welding processing along the circumferential direction of the housing 10 at a portion 62A from the state in FIG. 3 at a position (in the present embodiment, the end of the side surface portion 22 closer to the holder 20) corresponding to the side surface portion 22 covered by the side surface cover 51. Due to the welded fixed portion 62, a passage of air between the inside and the outside of the activation gas generation chamber 17 is restricted as compared with the related art. As shown in FIG. 3, the end of the second tubular portion 51*e* is a portion that abuts on the positioning portion 23 before execution of the welding fixing.

As shown in FIG. 1, the igniter 50 as an ignition unit of a gas generating agent 30 is disposed at one end (that is, a portion closer to the holder 20) in the axial direction of the housing 10. The igniter 50 and the holder 20 that fixes the igniter 50 have a function as an ignition unit that generates flame for burning the granular gas generating agent 30 described later.

As shown in FIGS. 1 and 2, the igniter 50 is inserted into the keeper 26 of the first forming portion 20*a*, and is fixed toward the holder 20 by the side surface cover 51. Specifically, as described above, the end of the side surface cover 51 is fixed in a state of being sandwiched between the igniter abutment portion 51*d* of the side surface cover 51 and the holder 20 (particularly, the keeper 26) by being welded and fixed to the housing 10 and the holder 20.

More specifically, the igniter 50 includes a base frame that keeps and allows a pair of terminal pins 52 to pass therethrough, and a squib cup 50*a* attached on the base frame. A resistor (bridge wire) is attached so as to couple a distal end of the terminal pins 52 inserted into the squib cup 50*a*, and the squib cup 50*a* is filled with an ignition charge so as to surround the resistor or to be in contact with the resistor. A nichrome wire or the like is generally used as the resistor, and zirconium-potassium-perchlorate (ZPP), zirconium-tungsten-potassium perchlorate (ZWPP), lead tricinate, or the like is generally used as the ignition charge. The inside of the squib cup 50*a* may be filled with not only an ignition charge but also an enhance agent. As the enhance agent that can be arranged simultaneously with the ignition charge, a composition including a metal/oxidizing agent represented by boron/potassium nitrate or the like, a composition including titanium hydride/potassium perchlorate, a composition including boron/5-aminotetrazole/potassium nitrate/molybdenum trioxide, or the like is used. The squib cup generally includes metal or resin.

When a collision is detected, a predetermined amount of current flows through the resistor through the terminal pins 52. When a predetermined amount of current flows through the resistor, Joule heat is generated in the resistor, and the ignition charge starts combustion. A high-temperature flame generated by the combustion causes the squib cup 50*a* storing the ignition charge to rupture. Time until the igniter 50 is activated after the current flowing through the resistor is 2 milliseconds or less in a case where a nichrome wire is used for the resistor.

As shown in FIG. 1, the activation gas generation chamber 17 in which the gas generating agent 30 is loaded, the filter chamber 18 in which a filter 40 is accommodated, and the ignition chamber 19 in which a winding spring 35 is accommodated are provided in an internal space of the housing 10. The activation gas generation chamber 17 and the filter chamber 18 are partitioned by a partition member 31.

An AI agent 32 having an auto-ignition (AI) function of automatically igniting without depending on the activation of the igniter 50 and the gas generating agent 30 are provided on the side of the activation gas generation chamber 17 of the partition member 31 described later.

As shown in FIG. 1, the gas generating agent 30 is an integrally molded product that is provided between the winding spring 35 and the cover member 33, is ignited by flame generated by being ignited by the igniter 50, and generates gas by burning. The gas generating agent 30 is generally formed as a molded body containing fuel, an oxidant, and an additive. As the fuel, for example, a triazole derivative, a tetrazole derivative, a guanidine derivative, an azodicarbonamide derivative, a hydrazine derivative, or the like, or a combination thereof is used. Specifically, for example, nitroguanidine, guanidine nitrate, cyanoguanidine, 5-aminotetrazole, or the like is suitably used. Examples of the oxidizer include basic metal hydroxides such as basic copper nitrate and basic copper carbonate, perchlorate such as ammonium perchlorate or potassium perchlorate, and nitrates containing cations selected from alkali metals, alkaline earth metals, transition metals, and ammonia. As the nitrate, for example, sodium nitrate, potassium nitrate or the like is suitably used. Examples of the additive include a binder, a slag forming agent, and a combustion adjusting agent. As the binder, for example, a cellulose derivative such as hydroxypropylene methyl cellulose, an organic binder such as a metal salt of carboxymethyl cellulose and a stearate, and an inorganic binder such as synthetic hydroxytalcite and acidic clay can be suitably used. As the slag forming agent, silicon nitride, silica, acid clay, and the like can be suitably used. As the combustion adjusting agent, metal oxide, ferrosilicon, activated carbon, graphite, and the like can be suitably used.

As shown in FIG. 1, in the ignition chamber 19, the winding spring 35 is spirally wound along the inner wall of the housing 10 facing an outer periphery of the side surface cover 51 so as to have a tubular shape as an entire appearance. The winding spring 35 is provided such that one end is in contact with an outer surface of the side surface cover 51 and another end abuts on the gas generating agent 30 to bias an elastic force to the gas generating agent 30. By this biasing, the gas generating agent 30 is fixed in the housing 10 so as to be sandwiched between the winding spring 35 and the cover member 33.

Since the AI agent 32 having an AI function automatically ignites at a temperature lower than a temperature of the gas generating agent 30, it is possible to prevent induction of an abnormal operation of the gas generator 100 due to heating from the outside in a case where a fire or the like occurs in a vehicle or the like equipped with an airbag device or the like in which the gas generator 100 is incorporated. As a result, in a case where a fire or the like occurs in a vehicle or the like equipped with an airbag device or the like in which the gas generator 100 is incorporated, it is possible to further prevent the gas generating agent 30 from burning before the automatic ignition of the AI agent 32. The cover member 33 may be any disk-shaped member including metal, an alloy, or the like as long as the cover member 33 partitions the AI agent 32 and the gas generating agent 30 so as not to come into contact with each other. For example, a plurality of holes may be provided, or no hole may be provided.

As shown in FIGS. 1 and 2, the partition member 31 has a substantially bowl shape, and is provided with a cut line (score) (not shown) near a center of a bottom so as to be easily broken when a predetermined pressure is applied. A side surface portion of the partition member 31 is welded and fixed in an annular shape in the circumferential direction of the housing 10 at the welded fixed portion 61.

As shown in FIG. 1, the filter chamber 18 communicates with the outside via the gas ejection port 11 provided in the peripheral wall of the housing 10 described above. In the filter chamber 18, the filter 40 including a cylindrical member having a substantially columnar space 40*a* at a center is accommodated. By using the filter 40 including a cylindrical member in this manner, a flow resistance of an activation gas flowing through the filter chamber 18 at the time of at the time of activation is suppressed to be low, and efficient gas flow is possible. As the filter 40, for example, a wire material including metal such as stainless steel or steel, a wire material obtained by winding a net material, a wire material obtained by pressing a net material, or the like is used. Specifically, a knitted wire mesh, a plain weave wire mesh, an aggregate of crimp weave metal wire materials, or the like is used. The filter 40 functions as a cooling unit that cools gas by depriving high temperature heat of the gas when the gas generated in the activation gas generation chamber 17 passes through the filter 40, and also functions as a removal unit that removes slag and the like contained in the gas. Here, as a modification of the filter 40, a filter having a labyrinthine flow path formed by combining substantially cylindrical or mortar-shaped parts including metal may be used. As a result, since a course of the activation gas can be changed in various directions, it is possible to cool the gas and remove the slag.

Note that a female connector (not shown) is attached to the second forming portion 20*b*. The female connector is a portion to which a male connector of a harness that transmits a signal from a collision detector provided separately from the gas generator 100 is connected. A retainer (not shown) is attached to the female connector. The retainer is attached to prevent the cylinder-type gas generator 100 from malfunctioning due to electrostatic discharge or the like at the time of conveyance of the gas generator 100 or the like, and when the male connector of the harness is inserted into the female connector at an assembling stage to the airbag device, a contact with the terminal pins 52 is released.

Next, an operation of the gas generator 100 described above at the time of activation will be described. When the vehicle equipped with the airbag device in which the gas generator 100 according to the preset embodiment is incorporated collides, the collision is detected by a collision detector separately provided in the vehicle, and on the basis of the detection, the igniter 50 is activated. When the igniter 50 is activated, the pressure in the igniter 50 is increased by the combustion of the ignition charge. Thus, a distal end of the squib cup 50*a* of the igniter 50 ruptures, and flame flows out from the distal end of the squib cup 50*a* of the igniter 50 into the side surface cover 51.

While the flame flowing in in this manner is aggregated by the tapered portion 51*b* of the side surface cover 51, the bottom 51*a* of the side surface cover 51 is cleaved, and the gas generating agent 30 in a container 34 is further ignited and burned to generate a large amount of gas. At this time, since the flame is aggregated, the flame is likely to be emitted to a back side (toward the filter chamber 18) of the activation gas generation chamber 17. The combustion of the gas generating agent 30 increases the pressure in the activation gas generation chamber 17, and thus, the partition member 31 is cleaved, and the gas flows into the filter chamber 18. Note that a folded portion of the partition member 31 having a substantially bowl shape can prevent the gas from flowing between the filter 40 and the inner wall of the housing 10, and thus prevents the gas from being discharged to the outside without passing through the filter 40. In this manner, the gas flowing into the filter chamber 18 passes through the filter 40 to be cooled to a predetermined temperature. The cooled large amount of gas is ejected from the gas ejection port 11 to the outside of the gas generator 100. The gas ejected from the gas ejection port 11 is guided into an airbag to inflate and deploy the airbag.

(Main Characteristics of Gas Generator 100)

In the present embodiment, due to the formation of the welded fixed portion 62 which is easy to work, the passage of air between the inside and the outside of the activation gas generation chamber 17 is restricted as compared with the related art. It is therefore possible to provide the gas generator 100 that can better suppress degradation of the gas generating agent 30 in the housing due to moisture absorption and is easier to assemble than the related art.

Since a member such as an O-ring or a sealing material is not required, the number of parts can be reduced as compared with the related art.

As described above, the embodiment of the present invention has been described with reference to the drawings. However, the specific configuration of the present invention shall not be interpreted as to be limited to the embodiment. The scope of the present invention is defined not by the above embodiment but by claims set forth below, and shall encompass the equivalents in the meaning of the claims and every modification within the scope of the claims.

In the above embodiment, a vicinity of the end of the side surface cover 51 is welded and fixed to form the welded fixed portion 62, but the present invention is not limited to this configuration. For example, an intermediate portion of the second tubular portion 51*e* of the side surface cover 51 may be welded and fixed to the housing 10 and the side surface portion 22 of the holder 20.

The length of the second tubular portion 51*e* of the side surface cover 51 is not required to be long enough to come into contact with the positioning portion 23. However, in this case, the end or the intermediate portion of the second tubular portion 51*e* of the side surface cover 51 is required to be reliably welded and fixed to the housing 10 and the side surface portion 22 of the holder 20.

REFERENCE SIGNS LIST

10 Housing
11 Gas ejection port
12 Closing member
17 Activation gas generation chamber
18 Filter chamber
19 Ignition chamber
20 Holder
20*a* First forming portion
20*b* Second forming portion
21 Fitting portion
22 Side surface portion
23 Positioning portion
24 Side surface portion
26 Keeper
30 Gas generating agent
31 Partition member
32 AI agent
33 Cover member
34 Container
35 Winding spring
40 Filter
40*a* Space
50 Igniter
50*a* Squib cup
51, 151, 251, 351 Side surface cover
51*a*, 151*a*, 251*a*, 351*a* Bottom
51*b*, 151*b*, 251*b*, 351*b* Tapered portion
51*c*, 151*c*, 251*c*, 351*c* First tubular portion
51*d*, 151*d*, 251*d*, 351*d* Igniter abutment portion
51*e*, 151*e*, 251*e*, 351*e* Second tubular portion
52 Terminal pin

60, 61, 62 Welded fixed portion
100 Gas generator

The invention claimed is:

1. A gas generator comprising:

a housing having an elongated cylindrical shape extending in an axial direction and including, inside of the housing, an activation gas generation chamber in which an activation gas is generated by combustion of a gas generating agent, and a filter chamber in which a filter through which the activation gas generated in the activation gas generation chamber passes is accommodated;

a gas generating agent ignition unit that encloses an ignition charge, is disposed at one end in the axial direction of the housing, and allows the gas generating agent to be ignited and combusted in the activation gas generation chamber; and a holder fixed to the one end in the axial direction of the housing and including a first holder portion having a substantially tubular shape and defining a keeper that keeps the gas generating agent ignition unit on an inner side of the housing, and a second holder portion having a substantially tubular shape, integrally provided with the first forming portion on a side of the first holder portion opposite to the activation gas generation chamber, and defining a connector fitting portion configured to be fitted with a connector for energizing the gas generating agent ignition unit on an opposite side of a keeping position of the gas generating agent ignition unit; and a side surface cover that is a bottomed tubular member defining a tubular cover portion, wherein the side surface cover is configured to cover at least a part of the gas generating agent ignition unit facing the activation gas generation chamber and at least a part of a side surface of the first holder portion, in a radial direction perpendicular to the axial direction of the housing, the tubular cover portion is sandwiched between an inner wall of the housing and the side surface of the first holder portion to form radially overlapping portions of the housing, the tubular cover portion, and the side surface of the first holder portion which overlap each other in the radial direction, and the radially overlapping portions of the housing, the tubular cover portion, and the side surface of the first holder portion are fixed together by an annular welding fixation extending annularly along a circumferential direction of the housing.

2. The gas generator according to claim 1, wherein in the axial direction of the housing, the side surface cover has a first end directed toward the holder and a second end directed toward the activation gas generation chamber, and the welding fixation coincides with the first end of the side surface cover.

3. The gas generator according to claim 1, wherein in the axial direction of the housing, the side surface cover has a first end directed toward the holder and a second end directed toward the activation gas generation chamber, and the second end of the side surface cover is provided with a bottom surface, and a tapered portion that is connected to the bottom surface and reduces in diameter toward another end in the axial direction of the housing.

4. The gas generator according to claim 2, wherein the second end of the side surface cover is provided with a bottom surface, and a tapered portion that is connected to the bottom surface and reduces in diameter toward another end in the axial direction of the housing.

5. The gas generator according to claim 2, wherein in the axial direction of the housing, the first end of the side surface cover aligns with the one end of the housing, and the welding fixation coincides with the first end of the side surface cover and the one end of the housing.

6. The gas generator according to claim 5, wherein the holder includes an annular surface defined where the second holder portion extends outward from the side surface of the first holder portion in the radial direction, and the welding fixation coincides with the first end of the side surface cover, the one end of the housing, and the annular surface of the holder.

* * * * *